United States Patent [19]  
Lainey et al.

[11] 4,091,239  
[45] May 23, 1978

[54] BIT ERROR RATE PERFORMANCE MONITOR UNITS IN DIGITAL TRANSMISSION LINKS

[76] Inventors: Gilbert P. Lainey, 7, rue Hebert, 92140 Clamart; Jean-Claude A. Imbeaux, 69, rue Dunois, 75646 Paris Cedex, both of France

[21] Appl. No.: 777,740
[22] Filed: Mar. 15, 1977

[30] Foreign Application Priority Data

Mar. 17, 1976 France .................. 76 08289

[51] Int. Cl.² .............................................. H04J 3/14
[52] U.S. Cl. ..................... 179/15 BF; 179/175.2 C; 325/41; 340/146.1 AV; 340/146.1 BE
[58] Field of Search ...... 179/15 BF, 15 AD, 175.2 R, 179/175.2 C; 340/146.1 AV, 146.1 BE, 146.2; 325/41, 42

[56] References Cited

U.S. PATENT DOCUMENTS

| 3,721,959 | 3/1973 | George | 325/41 |
| 3,777,268 | 12/1973 | Cleobury | 179/15 AD |
| 3,873,775 | 3/1975 | Chown | 179/15 BF |
| 3,895,349 | 7/1975 | Robson | 340/146.1 AV |

Primary Examiner—David L. Stewart  
Attorney, Agent, or Firm—Bierman & Bierman

[57] ABSTRACT

A bit error performance monitor in which the input signal is equally shared by two substantially identical monitors whose outputs in turn are connected to an adder. The output of the adder passes through a divider-by-2 to a counter.

2 Claims, 1 Drawing Figure

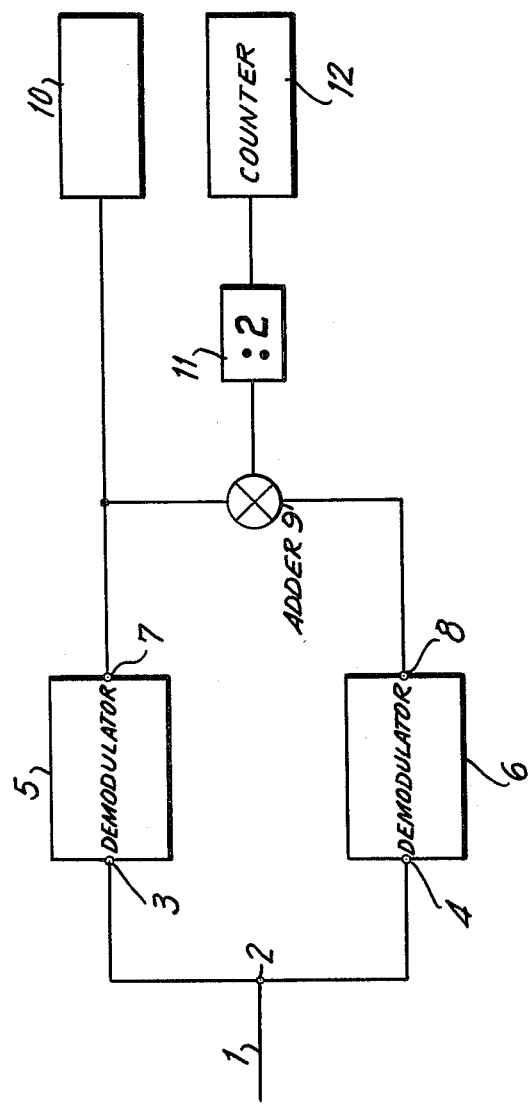

BIT ERROR RATE PERFORMANCE MONITOR UNITS IN DIGITAL TRANSMISSION LINKS

The present invention relates to bit error rate performance monitor unit in digital transmission under operation.

Presently, for measuring the quality of a digital transmission link, it is known to transmit a known sequence of bits on the link, then to compare the received sequence with the transmitted sequence, and finally to derive therefrom the bit error rate that provides the desired measure. That method has the drawback of reducing the traffic capacity of the link under test when it is being used permanently. When the link operation is interrupted to transmit the known sequence of bits, the measure is limited on short period of time and consequently cannot reveal every temporary change in the link, such, for instance, as a temporary propagation fading.

Redundancy of groups of bits transmitted in normal operation may also be utilized, but when the bit error rate is low, the measure becomes slow and produces only a mean figure over a long time period during which short fluctuations may have occurred.

Practically, it is of interest to have a substantially instantaneous measure of the quality of a digital transmission link.

A purpose of the present invention is to provide bit error rate performance monitor units in digital transmission links providing substantially instantaneous performance evaluation which overcomes the drawbacks of the devices using the above-mentioned methods.

In the U.S. patent application filed as of even date, by the first-mentioned applicants, G. Lainey and D. Duponteil, under Ser. No. 777,739 and entitled "Bit error rate performance monitor unit in digital transmission links" performance monitor units are described which are usable whenever the bit error rate is in a digital transmission link and provides accurate results particularly when the bit error rate is low. However, means utilized in those performance monitor units may still be simplified and a purpose of the present invention consists in providing other units using extremely simple means for evaluating bit error rates in a digital transmission link.

According to a feature of the present invention, there is provided a bit error rate performance monitor unit for use with digital transmission link under operation wherein two demodulators have their respective inputs parallel connected from the digital transmission link reception end, power of the signal delivered from the said digital transmission link being equally shared by two demodulators of identical structure, the respective outputs of which are fed into an adder whose output is connected to a counter, the two demodulators being correctly set and the said counter output being connected to a divider-by-2 that delivers the bit error rate measure.

The above-mentioned feature, as well as others, will appear more clearly from the following description of an embodiment, the said description being made in conjunction with the accompanying drawing wherein the single FIGURE shows a performance monitor unit according to this invention.

In the single FIGURE, digital transmission link 1 feeds from junction point 2 the inputs 3 and 4 of the two demodulators 5 and 6, respectively. Outputs 7 and 8 of those demodulators are respectively connected to the inputs of a known modulo-2 adder 9, output 7 being in addition connected to operative circuits 10 of conventional structure. Output of adder 9 is connected to a digital divider-by-2 11 whose output is connected to input of a counter 12 that displays the bit error rate to be evaluated. Assumption is made that means (not shown) may be provided at junction point 2 in order to equally share the power of the signal supplied from link 1 to inputs 3 and 4, those means being possibly conventional.

According to this invention and contrary to what is provided in the units described in the above-mentioned Patent Application, both demodulators 5 and 6 are correctly set and tuned. Thus can be made that the bit error rate $\tau_1$, at output 7 and the bit error rate $\tau_2$ at output 8 are such that $$\tau_1 \simeq \tau_2$$

As the same signal and the same noise are indeed applied to both demodulators 5 and 6, the output of adder 9 should deliver a number of pulses per time unit that should be substantially null. However, it appears that the actual relation is:

$$\tau \simeq \tau_1 + \tau_2 \simeq 2\tau_1$$

This results from the fact that errors made in the two demodulators are uncorrelated so that they are added together in 9. It may be assumed that such a phenomenon would be explained as follows. An actual demodulator is never perfect. At any given point of operation, an actual demodulator makes $\lambda$ times as numerous errors as expected, according to theoretical considerations like those described in the technical article entitled "Performance of digital phase modulation communication system" issued in the technical review IRE Transactions on Communications Systems, May 1959, pages 3–6. Thus, amongst $\lambda$ errors made by a demodulator there is only one theoretical error, the order $(\lambda - 1)$ errors are caused by defects in the demodulator (noised decision threshold, bit rate jitter and regenerated carrier jitter, etc.). Those other $(\lambda - 1)$ errors caused by defects are not correlated when considering first demodulator 5, then demodulator 6. A theoretical error that is identical in both demodulators does not result in an output from adder 9; on the contrary, the uncorrelated $(\lambda - 1)$ errors result approximately in $2(\lambda - 1)$ pulses from output of adder 9.

Thus, there is the relation:

$$\frac{\tau}{\tau_1} = \frac{2(\lambda - 1)}{\lambda} = 2 - \frac{2}{\lambda}$$

For current values of $\lambda$, for instance for $\lambda = 10$, the result is $\tau/\tau_1 = 1.8$, that is, a ratio close to 2.

Thus, it suffices to apply pulses from 9 to a divider-by-2 before transmitting them to a counter 12 that displays approximately the expected result.

It is to be noted that the unit according to this invention is particularly suitable for evaluating bit error rates in poor digital transmission links, such as satellite transmission links. Indeed, when the bit error rate is low, the multiplicand coefficient 2 will provide only a result that is difficult to evaluate. Thus, when the bit error rate is of $10^{-7}$, the period of time that is necessary to get a significant number of pulses will be rather long. On the other hand, with links wherein the bit error rate is currently of $10^{-5}$, the performance monitor unit according to this invention makes it possible to follow very rapidly the variations of the bit error rate as desirable.

It is to be noted that the unit according to this invention is very simple. The fact that the demodulators used are quite identical seems of interest in stations wherein the equipment utilized in conjunction with a great number of links are identical. Only one additional demodulator makes it possible to sequentially perform measurements on all the links without interrupting their traffic.

It is also to be noted that the unit according to this invention may be used for any digital transmission whatever the type of modulation is.

While the principles of the present invention have been hereabove described in relation with a particular embodiment, it must be clearly understood that the said description has only been made by way of example and does not limit the scope of this invention.

What is claimed is:

1. A bit error rate performance monitor unit for use in a digital transmission link having a receiving end and an operative output end comprising first and second demodulators having substantially the same structure, means connecting the receiving end of said data transmission link to the inputs of said demodulators, means connecting the operative output end to the output of said first demodulator, a module-2 adder having its inputs respectively connected to the outputs of said demodulators, a counter, and a divider-by-2 interconnecting the output of said adder with the input of said counter, whereby the bit error rate can be determined from the counter reading divided by the operation period.

2. The method of monitoring the bit error rate performance of a digital transmission link, comprising the steps of passing the received signals simultaneously and equally through two demodulators having substantially identical characteristics, adding the outputs of the two demodulators by a module-2 adding operation, dividing by 2 the results of such addition, and measuring the bit error rate resulting from such division.

* * * * *